United States Patent [19]

Cymara

[11] Patent Number: 5,495,999
[45] Date of Patent: Mar. 5, 1996

[54] RETRACTABLE CANARD WING SURFACES FOR AIRPLANES

[76] Inventor: Hermann K. Cymara, 106 Stonehaven Cir., Newfield, N.Y. 14867

[21] Appl. No.: 390,553

[22] Filed: Feb. 17, 1995

[51] Int. Cl.⁶ ........................................ B64C 3/56
[52] U.S. Cl. .................... 244/45 A; 244/46; 244/49; 244/218
[58] Field of Search ................. 244/3.27, 3.29, 244/49, 45 R, 45 A, 46, 47, 48, 56, 218, 385; 102/385, 386, 388

[56] References Cited

U.S. PATENT DOCUMENTS

| | | | |
|---|---|---|---|
| 3,451,648 | 6/1969 | Pabst et al. | 244/56 |
| 3,460,783 | 8/1969 | Haberkorn | 244/56 |
| 4,542,866 | 9/1985 | Caldwell | 244/45 A |
| 5,074,493 | 12/1991 | Greenhalgch | 244/3.27 |

FOREIGN PATENT DOCUMENTS

| | | | |
|---|---|---|---|
| 1083557 | 1/1955 | France | 244/46 |
| 1168938 | 12/1958 | France | 244/218 |
| 2523938 | 12/1976 | Germany | 244/49 |

*Primary Examiner*—Galen L. Barefoot
*Attorney, Agent, or Firm*—Barnard, Brown & Michaels

[57] ABSTRACT

A canard wing surface for aircraft, especially supersonic aircraft, which can be lowered and retracted flush into the fuselage of the aircraft when no longer needed. The canard is hinged to an extendible platform at or near its upper edge, so that a raising mechanism on the platform can raise the canard from a position integral with the skin of the fuselage to a fully extended position as a curved wing. The platform is extended to allow the canard to clear the fuselage, and may be rotated to adjust the angle of attack of the canard from nearly flat, for the transition to high-speed flight, to a range of low-to-medium angles of attack when used as a lift surface during takeoff and landing, to nearly vertical for use as a speed brake during the landing roll. If desired, multiple canard surfaces can be used on an aircraft, arranged along the fuselage.

10 Claims, 2 Drawing Sheets

RETRACTABLE CANARD WING SURFACES FOR AIRPLANES

FIELD OF THE INVENTION

The invention pertains to the field of aircraft control surfaces. More particularly, the invention pertains to canard-type wing surfaces which may be retracted flush with the aircraft fuselage when not in use.

BACKGROUND OF THE INVENTION

The main structural components of modern aircraft are the fuselage; wings; empennage, or tail surfaces; power plant; and landing gear, or undercarriage. The fuselage is the main body structure to which the wings, tail, landing gear, and power plants are attached. It contains the cockpit or flight deck, passenger compartment, cargo compartment, and-especially in the case of fighter aircraft—the engines and fuel tanks.

The wing is the most important lift-producing element of an aircraft. Wing designs vary, depending on the aircraft type and purpose. Propeller-driven aircraft normally have an all-metal straight wing with a thick camber, or curvature. Jet transports have swept-back wings of medium camber that lower aerodynamic drag and improve performance at high airspeeds. Both straight and swept-wing aircraft normally have ailerons attached to the outermost trailing edges of the wing. These ailerons raise and lower in opposition to one another, to increase or decrease lift on their respective wing in order to facilitate turning the aircraft. The wing also has flaps along the trailing edge, inboard of the ailerons. Flaps increase aerodynamic lift and drag and are used during takeoff and landing to increase lift at low speeds. Modern swept-wing transport aircraft also have high lift devices called leading-edge slats, which extend in conjunction with the flaps to further increase the lifting capability of the wing.

The conventional type of tail assembly consists of two basic surfaces, horizontal and vertical, each of which has movable sections contributing to control of the craft and fixed sections to provide stability. The leading section of the horizontal surface is known as the horizontal stabilizer, and the rear movable section, as the elevator. The stationary section of the vertical surface is called the fin, and the movable section, the rudder. Two vertical surfaces are used in some aircraft; in that case, a double rudder is used. The V-shaped tail combines the rudder and elevator functions in a single device.

Tails vary in size according to the type of aircraft, but in supersonic flight the tail should be as small as possible. Its complete elimination would be the ideal design. This has led to the delta wing and similar designs, in which there are no horizontal tail surfaces. Instead, the wing trailing edge control surfaces can act together to adjust aircraft pitch in the same way as the elevators, and can also act opposably to bank the aircraft. Such surfaces are called "elevons".

The first powered, controllable aircraft, Orville and Wilbur Wright's flying machine, demonstrated in its structure the same basic principles of flight as do today's high-flying jets. The wings, or airfoils, of the original 1903 Wright Flyer resembled a box kite. A small pair of wings, called a canard, was located forward of the main wings and provided control about the pitch axis, allowing the aircraft to climb or descend. The canard performed the same function as the elevators that are attached to the horizontal stabilizers on most modern aircraft or the elevons on delta wing aircraft.

Aircraft that can fly faster than the speed of sound, have been used by the military for many years. Commercial supersonic aircraft (SuperSonic Transports, or SSTs) have been limited to the Concorde, built by the British and French in the 1960's (first flight in 1969), which has proved to be a commercial failure in large part because of the vast amounts of fuel it consumes. The Russians have also built an SST, the TU-144 (known in the west as the "Concordski"), but it was not a successful design and was withdrawn from service after several disastrous crashes.

One of the main drawbacks of the SST design is that it must be optimized for high-speed flight in order to reach supersonic speeds. It has been discovered that the best shape for optimum cruise at Mach 2 is a slender straight edged delta twice as long as its span. The "ogival" wing form used on the Concorde (see FIG. 1) is an attempt to modify the optimum delta for greater efficiency at low speeds, particularly at take-off and landing. Despite this, the Concorde shows very high fuel consumption and low lift at low altitude and speed, and requires a very long take-off roll. Similarly, the very "slippery" shape requires a very long landing roll due to high landing speeds and low drag. The prototype Concorde even used a parachute to aid the brakes in landing, and such devices are common in military aircraft.

In order to gain lift for takeoff, the wing must be raised to a higher angle of attack (angle of the wing relative to the airflow over the wing) than it has on the runway. This is known to pilots as "rotation", when the nose is raised to increase lift for takeoff. In order to rotate the aircraft in the normal aircraft design, the elevators are angled trailing-edge-upward to exert a downward force at the rear of the fuselage. This raises the nose, but at the cost of a downward force on the aircraft just when the aircraft most needs all the lift it can muster.

The solution to this problem is the canard—the same tail-first design idea that the Wright Brothers used. The canard wing exerts an upward force at the front of the aircraft, increasing the total lift available while rotating the aircraft. The canard, if its angle of attack is properly set, can also reduce the likelihood of a catastrophic full-power takeoff stall by stalling before the main wing stalls, lowering the nose of the aircraft.

This design has been popularized by such designers as Burt Rutan (the VariEze, Voyager, and others), and is currently being commercially produced in the Beechcraft Starship. Some supersonic delta-wing designs have used canards. An early supersonic bomber, the B-70 Valkyrie, is an example of this, as is the SAAB Viggen fighter made in Sweden.

However, just as the canard is advantageous at low speeds, it is disadvantageous at supersonic speeds. At those speeds lift is abundant even at low angles of attack and small wing areas and thickness, but drag is an overwhelming problem.

As far as landing is concerned, the SST needs all the help it can get to slow down from its high landing speeds. Parachutes are not really useful in commercial applications, leaving the thrust reversers and wheel brakes to do the job.

SUMMARY OF THE INVENTION

The invention comprises a canard wing surface for aircraft, especially supersonic aircraft, which can be lowered and retracted flush into the fuselage of the aircraft when no longer needed. The canard is hinged to an extendible platform at or near its upper edge, so that a raising mechanism on the platform can raise the canard from a position integral with the skin of the fuselage to a fully extended position as a curved wing. The platform is extended to allow the canard to clear the fuselage, and may be rotated to adjust the angle of attack of the canard from nearly flat, for the transition to high-speed flight, to a range of low-to-medium angles of attack when used as a lift surface during takeoff and landing, to nearly vertical for use as a speed brake during the landing roll. If desired, multiple canard surfaces can be used on an aircraft, arranged along the fuselage.

DESCRIPTION OF THE PREFERRED EMBODIMENT

In the discussion of the drawings to follow, identical reference numbers are applied to identical features from figure to figure.

Figure 1:
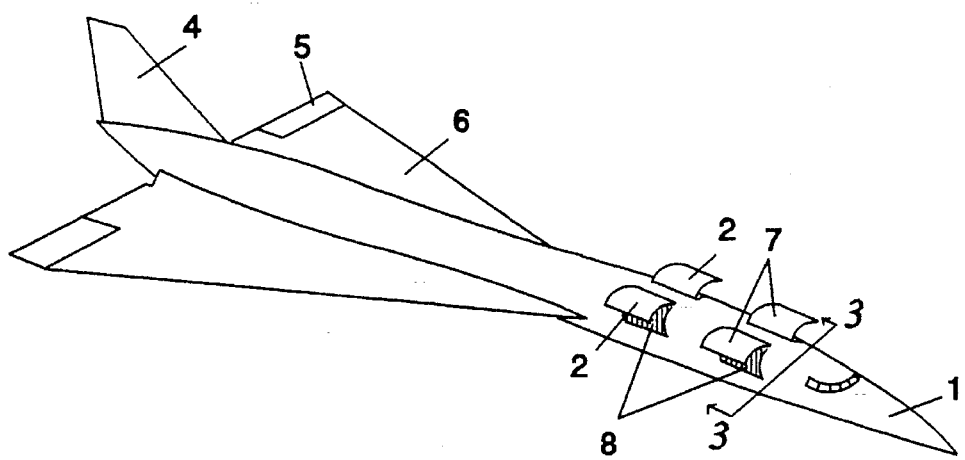
FIG. 1 shows a perspective view of an airplane with two sets of canard wings according to the teachings of the invention.

FIG. 1 shows a representative supersonic aircraft (1) equipped with two sets of the canard wings (2) and (7) of the invention. Although the aircraft in the figures is patterned after the Concorde, with ogival wings (6), elevons (5) and a single vertical tail surface (4), it will be understood that this design was chosen for example only, and the invention is not restricted to the specific aircraft shown.

It will be understood that two sets of wings (2) and (7) shown are shown in FIG. 1 to illustrate that multiple sets of wings are possible under the teachings of the invention, and that the more conventional single set of wings may be also be used, as the designer wishes.

Figure 2:
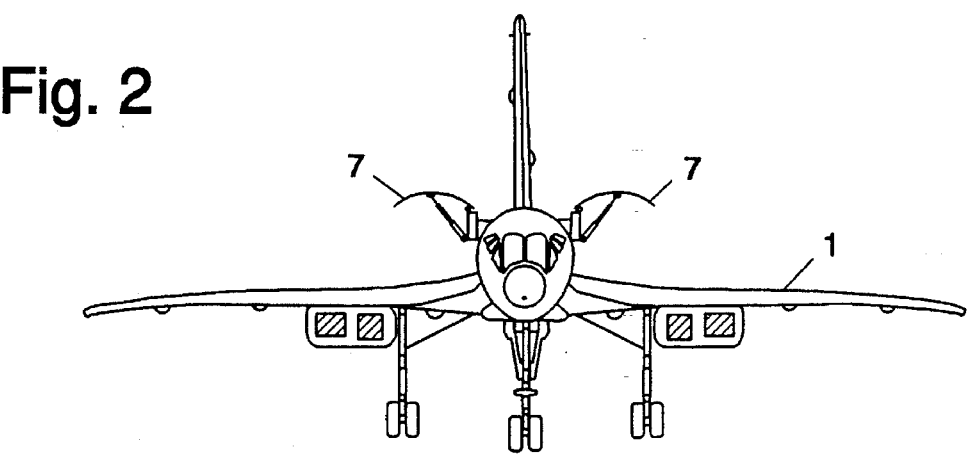
FIG. 2 shows a front view of an airplane with canard wings according to the teachings of the invention.

FIG. 2 shows a front view of the aircraft (1), with a single set of the canard surfaces (7) in fully extended position at a low angle of attack. It can be seen from FIGS. 1 and 2 that the canard surfaces of the invention are curved to fit the shape of the fuselage, so that when they are lowered and retracted they fit exactly into a recess in the structure of the fuselage and present no added drag. The recess is seen as the shaded area (8) under the canards in FIG. 1. Preferably, the edges of the recess and canard are reciprocally beveled to minimize drag when the canard is extended and allow a close fit when it is retracted.

Figure 3:
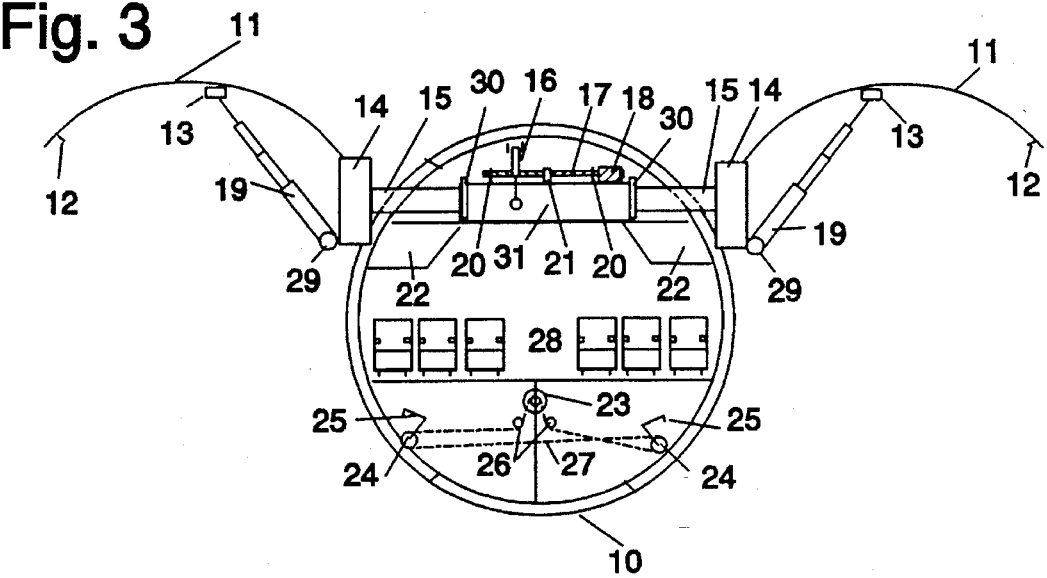
FIG. 3 shows a cut-away front view of an airplane with extended canard wings according to the teachings of the invention, along the lines 3—3 in FIG. 1.
Figure 4:
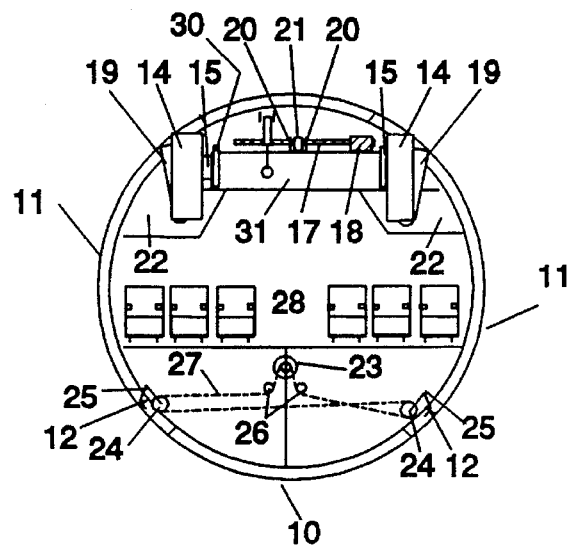
FIG. 4 shows the same view as FIG. 3, with the canard wings retracted.

FIGS. 3 and 4 show the mechanism of the invention, with the canards extended and retracted, respectively. The canard surface (11) conforms to the shape of the fuselage (10), in this case shown as a simple circular cross-section.

Each canard (11) is hinged at or near its upper end to platform (14). At the lower end of platform (14) is hinged (29) the lifting mechanism, here shown as hydraulic cylinder (19), which attaches at (13) to canard (11). Other forms of extension are possible, such as cables and struts or the like, but hydraulic mechanisms are preferred as being proven and reliable in the field.

The platforms (14) are mounted on extension arms (15), which are slidably fit into support cylinder (31) which extends through the aircraft fuselage. The extension arms can be extended by any means which is convenient for the designer, such as by dual-action hydraulic cylinders or the like, but the preferred method shown uses tabs (20) which extend from the extension arms (15) through slots in the support cylinder (31). The tabs are moved by dual-threaded rod (17) which is powered by motor (18) and supported by bearing (21). The threading on the rod is split, such that when the motor is turned in one direction, the tabs are moved in opposite directions—either toward the bearing (21) or away from it.

The support cylinder (31) is rotatably mounted on bearings (30), so that it can be rotated by a rotation mechanism such as hydraulic cylinder (16). A worm/spur gear arrangement could also be used if desired. The rotation of the support cylinder (31) causes the extension arms (15) and attached platforms (14) to rotate, thereby altering the angle of attack of the canard surfaces (11).

A latching mechanism should be provided to secure the retracted canards securely to the fuselage. In the embodiment shown, this takes the form of hooks (25) which are mounted on pulley wheels (24). Wheels (24) are rotated by cable (27), which runs over idler pulleys (26) and (27), and is powered by a motor (23). It will be noted that cable (27) is crossed at one point, so that both hooks (25) will rotate downward simultaneously. The hooks (25) are set to engage with mating loops (12) on the canards (11).

FIG. 4 shows the same view as FIG. 3, with the canards (11) retracted against the fuselage (10). The platforms (14) are rotated by means of the support cylinder (31) until the canards (11) are flat (i.e. not inclined relative to the recess into which they retract (FIG. 1, (8)). The motor (18) has rotated the dual-threaded rod (17) to move tabs (20) inward, pulling the extension shafts (15) back inside the support cylinder (31). This causes the platforms to retract inside recesses (22) provided for them. The canards (11) are then lowered by hydraulic cylinders (19) until they are flush with the fuselage (10), and are then latched into place by hooks (24) and loops (12).

The rotating ability of the canards of the invention allow the canards to serve a number of functions.

Figure 5:
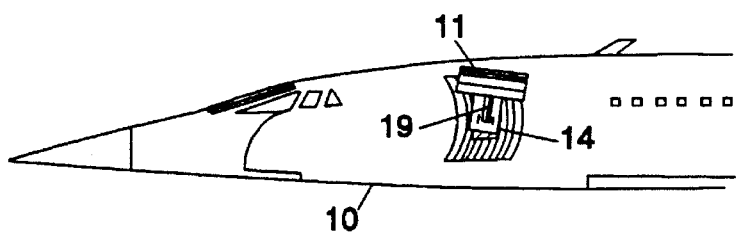
FIG. 5 shows a side view of the front portion of an airplane fuselage having canard wings according to the teachings of the invention, with the canard wings at low angle of attack for takeoff.
Figure 6:
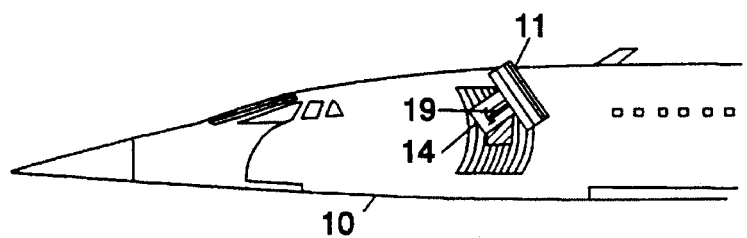
FIG. 6 shows a side view of the front portion of an airplane fuselage having canard wings according to the teachings of the invention, with the canard wings at high angle of attack for use as speed brakes.
Figure 7:
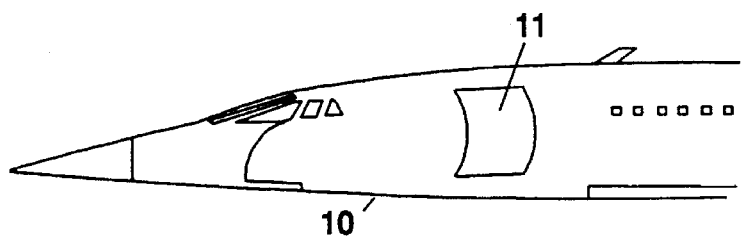
FIG. 7 shows a side view of the front portion of an airplane fuselage having canard wings according to the teachings of the invention, with the canard wings retracted into the fuselage.

FIGS. 5 through 7 show a side view of an aircraft fuselage (10) equipped with canards (11) of the invention.

In FIG. 5 the canard is tipped to a slight positive angle of attack (somewhat exaggerated). This configuration would be used during takeoff to provide added lift at low speeds. The canards (11) would be extended by cylinders (19) before takeoff, with platforms (14) extended and tilted to the appropriate angle of attack for the expected load and conditions. As the aircraft reaches a stable cruise speed and attitude, the angle of attack can be decreased until the canard is flat and provides no lift. At that point, the canards are folded and retracted into the fuselage (FIG. 7), eliminating all drag and allowing the aircraft to accelerate to supersonic speeds.

Similarly, the canards are extended and unfolded to provide added lift as the aircraft slows down and approaches the airport for landing. The angle of attack of the canard will be increased as the aircraft slows down on final approach, which allows the supersonic aircraft to slow to lower speeds which will merge into conventional traffic, for entry into the pattern. After touchdown, the canards can be further rotated (FIG. 6)—if desired, even as much as 90°—to act as pure drag brakes without added lift. When the aircraft has slowed down to taxi speeds, the canards are rotated back to horizontal, retracted and folded (FIG. 7).

The control of the various components of the invention is not detailed herein, as being well within the abilities of one skilled in the art. It would be expected that various switches would be used to sense the position of the various components, and that an electromechanical or (preferably) microprocessor-based controller would be used to sequence the motors and hydraulics.

The sequence of operation of the canards of the invention is as follows:

1. Pre-takeoff (assuming canards are folded at the gate):
    a. Activate latch motor (23) to rotate hooks (24) free of loops (12).
    b. Activate extension motor (18) to rotate shaft (17), causing tabs (20) to extend extension arms (15) with platforms (14).
    c. Activate hydraulic cylinders (19) to raise canard surfaces (11).
    d. Adjust canard angle of attack as needed using cylinder (16) to rotate support cylinder (31).
2. After Takeoff: Reduce canard angle of attack as needed using cylinder (16) to rotate support cylinder (31), until canard is fully rotated (aligned with opening in fuselage).
3. At cruise:
    a. Activate hydraulic cylinders (19) to lower canard surfaces (11).
    b. Activate extension motor (18) to rotate shaft (17), causing tabs (20) to retract extension arms (15) with platforms (14).
    c. Activate latch motor (23) to rotate hooks (24) until they fully pull loops (12) tight.
4. On landing approach:
    a. Activate latch motor (23) to rotate hooks (24) free of loops (12).
    b. Activate extension motor (18) to rotate shaft (17), causing tabs (20) to extend extension arms (15) with platforms (14).
    c. Activate hydraulic cylinders (19) to raise canard surfaces (11).
    d. Adjust canard angle of attack as needed using cylinder (16) to rotate support cylinder (31), increasing angle of attack as the aircraft slows down on approach through touchdown.
5. After touchdown (if desired to used canards as speed brakes): Rotate canards, using cylinder (16) to rotate support cylinder (31), until canards stall and become drag elements—if desired, can rotate canards to 90° position, perpendicular to ground.
6. After rollout:
    a. Reduce canard angle of attack using cylinder (16) to rotate support cylinder (31), until canard is fully rotated (aligned with opening in fuselage).
    b. Activate hydraulic cylinders (19) to lower canard surfaces (11).
    c. Activate extension motor (18) to rotate shaft (17), causing tabs (20) to retract extension arms (15) with platforms (14).
    d. Activate latch motor (23) to rotate hooks (24) until they fully pull loops (12) tight.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A retractable canard wing apparatus for aircraft having a fuselage with forward and rear halves and a surface, comprising:

a pair of canard wings on opposite sides of the fuselage, having a shape conforming to sections of the fuselage surface, located in the forward half of the fuselage;

each of the canard wings being attached at one end thereof by a hinge to a rotatable platform;

each rotatable platform comprising a platform base, an extension arm extending into the fuselage of the aircraft, and a lifting mechanism connected to the platform base and the canard wing, such that when the lifting mechanism is activated the canard wing is pivoted on the hinge from a first, lowered position parallel to the fuselage to a second, raised position;

support cylinder means for supporting and rotating the extension arms of the rotatable platforms, rotatably mounted within the fuselage between the rotatable platforms;

the extension arms of the rotatable platforms slidably extending into the support cylinder, such that the extension arms can slide from a first, inboard position to a second, outboard position, being rotatably fixed to the extension arms such that when the support cylinder is rotated along its axis the extension arms and platforms are rotated, altering the angle of the canard wings relative to the fuselage;

rotation means for rotating the support cylinder, attached to the fuselage and to the support cylinder;

extension means for moving the extension arms from the first inboard position to the second outboard position.

2. The retractable canard wing apparatus of claim 1, in which the rotation means for rotating the support cylinder is a hydraulic cylinder having one end attached to the fuselage and the other end attached tangentially to the support cylinder.

3. The retractable canard wing apparatus of claim 1, in which the extension means for moving the extension arms comprises:

a tab on the end of each extension arm opposite the platform, extending through a longitudinal slot in the support cylinder, the slot being of such a length that when the extension arm is in the first, inboard position the tab is near the inboard end of the slot, and when the extension arm is at its second, outboard position, the tab is near the outboard end of the slot;

a dual-threaded shaft mounted on the support cylinder adjacent to the longitudinal slots, the shaft extending at least as far as the full length of both slots, the shaft being divided in half and differentially threaded on each half, such that rotation of the shaft in a single direction would cause tabs interacting with the threads on either half to move in opposite directions;

the tabs being threadedly connected to the dual-threaded shaft;

reversible motor means for rotating the dual-threaded shaft, operatively connected to the shaft;

such that rotation of the dual-threaded shaft by the reversible motor means in one direction causes the tabs to move apart, causing the extension arms to move to the second, outboard position, and rotation in the opposite direction causes the tabs to move together, causing the extension arms to move to the first, inboard position.

4. The retractable canard wing apparatus of claim 1, in which the support cylinder may be rotated 90° by means of the rotation means.

5. The retractable canard wing apparatus of claim 1, in which the lifting mechanism is a hydraulic cylinder.

6. The retractable canard wing apparatus of claim 1, in which, when the canard wings are fully lowered by the lifting mechanism, and the extension arms are moved to their first, inboard position by the extension means, the canard wings fit flush to the surface of the fuselage.

7. The retractable canard wing apparatus of claim 1, further comprising a locking mechanism for holding the canard wings tightly against the fuselage.

8. The retractable canard wing apparatus of claim 8, in which the locking mechanism comprises:

a loop mounted on the inner side of the end of each canard wing opposite the end hinged to the platform;

a hook rotatably mounted on the fuselage in such a position that when the hook is rotated from a first position to a second position it engages the loop on the canard wing and draws the canard wing tightly against the fuselage;

means for rotatably moving the hook from its first position to its second position.

9. An aircraft having having a fuselage with forward and rear halves and a surface, and at least one retractable canard wing apparatus comprising:

a pair of canard wings on opposite sides of the fuselage, having a shape conforming to sections of the fuselage surface, located in the forward half of the fuselage;

each of the canard wings being attached at one end thereof by a hinge to a rotatable platform;

each rotatable platform comprising a platform base, an extension arm extending into the fuselage of the aircraft, and a lifting mechanism connected to the platform base and the canard wing, such that when the lifting mechanism is activated the canard wing is pivoted on the hinge from a first, lowered position parallel to the fuselage to a second, raised position;

support cylinder means for supporting and rotating the extension arms of the rotatable platforms, rotatably mounted within the fuselage between the rotatable platforms;

the extension arms of the rotatable platforms slidably extending into the support cylinder, such that the extension arms can slide from a first, inboard position to a second, outboard position, being rotatably fixed to the extension arms such that when the support cylinder is rotated along its axis the extension arms and platforms are rotated, altering the angle of the canard wings relative to the fuselage;

rotation means for rotating the support cylinder, attached to the fuselage and to the support cylinder;

extension means for moving the extension arms from the first inboard position to the second outboard position.

10. The aircraft of claim 9 having multiple canard wing apparatus along the front half of the fuselage.

* * * * *